United States Patent [19]

Willard

[11] 3,872,389

[45] Mar. 18, 1975

[54] SIGNAL PROCESSOR

[75] Inventor: Frank G. Willard, Monroeville, Pa.

[73] Assignee: Westinghouse Electric Corporation, Pittsburgh, Pa.

[22] Filed: Feb. 12, 1974

[21] Appl. No.: 441,923

[52] U.S. Cl. ................ 328/137, 235/150.1, 328/147

[51] Int. Cl. .......................... G06g 7/14, H03k 5/20

[58] Field of Search ......... 235/151.3, 151.13, 150.1; 328/137, 146, 147, 158, 156, 117; 307/204, 211, 219

[56] References Cited

UNITED STATES PATENTS 3,667,057 5/1972 Pfersch, Jr. et al. ................ 328/147

3,771,167 11/1973 Ross ................................ 235/150.1

*Primary Examiner*—Eugene G. Botz
*Assistant Examiner*—Errol A. Krass
*Attorney, Agent, or Firm*—R. G. Brodahl

[57] ABSTRACT

A signal processor system and method is disclosed for use in an industrial process control environment in relation to scanning of low level analog signals, for averaging such signals that fall within a desired tolerance and for rejecting from the averaging operation any individual signal which fails to fall within the predetermined tolerance of the established average of the scanned input signals.

8 Claims, 10 Drawing Figures

| COUNT (OCTAL) | EVENT |
|---|---|
| 0000 | : STOP A/D CONVERSION; SELECT NEW INPUT (#0) |
| 0001 THRU 0371 | COMPARATOR & MUX SETTLING DELAY (NO DECODE) |
| 0372 | : NULL (NO DECODE) |
| 0373 | : ENABLE FAULT INDICATION; LATCH OUTPUT |
| 0374 | : NULL (NO DECODE) |
| 0375 | : RESET A/D CONVERTER |
| 0376 | : NULL (NO DECODE) |
| 0377 | : START A/D CONVERSION (THIS WILL BE FEEDBACK SIGNAL 27 VALUE |
| 0400 THRU 0777 | CONVERSION DELAY (NO DECODE) |
| 1000 | : STOP A/D CONVERSION; SELECT NEW INPUT (#1) |
| 1001 | : LATCH FEEDBACK |
| 1002 THRU 1376 | (SAME AS 0001 THRU 0376) |
| 1377 | : START A/D CONVERSION (THIS WILL BE FIRST INPUT SIGNAL) |
| 1400 THRU 1777 | (SAME AS 0400 THRU 0777) |
| 2000 | : STOP A/D CONVERSION; SELECT NEW INPUT (#2) |
| 2001 THRU 2376 | (SAME AS 0001 THRU 0376) |
| 2377 | : START A/D CONVERSION (2nd INPUT SIGNAL) |
| 2400 THRU 2777 | SAME AS 0400 THRU 0777) |
| 3000 THRU 7777 | (REPITION OF 2000-2777, 5 TIMES; FOR INPUT SIGNALS 3 THRU 7) |
| 0000 | : (BEGIN ALL OVER AGAIN) |

CONTROL SIGNAL DECODING FOR 16

FIG. 9

SIGNAL PROCESSOR

BACKGROUND OF THE INVENTION

Industrial process control operations require the processing of many input data signals in analog form and which are derived by sensing devices located at various points of the controlled industrial process. One such illustrative industrial process could be an industrial gas turbine and its associated control system, where it is desired to obtain one or more reliable blade path average temperature determinations in relation to additional loading of the gas turbine, and the various provided analog signals from a plurality of suitably located thermocouple devices are scanned for this purpose.

There is at least one group of blade path temperature sensing thermocouples provided within an industrial gas turbine that are used for monitoring selected combustion temperatures and determining whether operational events or conditions are proper inside the turbine, for example whether a flame-out condition has occurred or the like. There are also some exhaust path temperature sensing thermocouples provided within the gas turbine. It has been the common prior art practice to assign individually dedicated and rather expensive instrument amplifiers to boost the signal level of each of the thermocouple provided input signals up to a fairly substantial analog level, and then do some processing on each such signal so the whole group of signals will be collectively averaged. In this way, each individual thermocouple signal as amplified, with there being usually eight or ten of these signals considered together that will be so averaged, will be compared with the average of the group because each of them should be within a reasonable proximity of this average. For any individual thermocouple input signal that is undesired as being unusually high or unusually low, it should be rejected from this established average, and this requires some rescaling since this undesired input signal has previously influenced the average and so this influence should be removed from the average.

One prior art approach to the averaging of gas turbine blade path temperature analog signal readings employed dedicated thermocouple amplifiers, analog averaging amplifiers, analog comparators, and rather complex switching arrays to arrive at a desirable average signal for control purposes. Desirable in this context implies rejection of the influence by thermocouple signals which are obviously in error by being either too high or perhaps open-circuited. Alternatively, a digital computer can be employed to scan the signals, check their validity, and compute their average value including removal of undesired signals.

SUMMARY OF THE PRESENT INVENTION

The present invention involves an input signal processor system and method operative with various input signals representing respective points of process condition measurement to provide a predetermined numerical relationship, such as a common average condition signal for process control purposes, and which average condition signal includes the rejection of undesired input signals, to keep them from influencing the numerical relationship, such as the common average, which undesired input signals are in error such as being either too high or perhaps open-circuited and too low. The processor can be employed to scan the available input signals, to check their validity in regard to rejection of undesired input signals, and then establish the numerical relationship, such as an average value, of only the desired input signals.

In industrial process control systems which operate in the absence of a digital computer, the present invention provides an effective and reliable apparatus for clean input signal processing which is appreciably simpler and less expensive than the prior art all analog or all digital alternatives.

The use of cyclic scanning and outputting of analog signals into a single analog output channel to achieve timewise averaging, together with the substitution of a sampled reading of that average in place of any defective and undesired input signal to be rejected before it is included in the average, so as to eliminate out-of-tolerance readings without recalibrating the resulting average signal value, is provided by the present invention.

BRIEF DESCRIPTION OF THE DRAWINGS

FIG. 9 is a chart illustrating the control signal decoding operation of the decoder shown in FIG. 4.

DESCRIPTION OF THE PRESENT INVENTION

Figure 1:
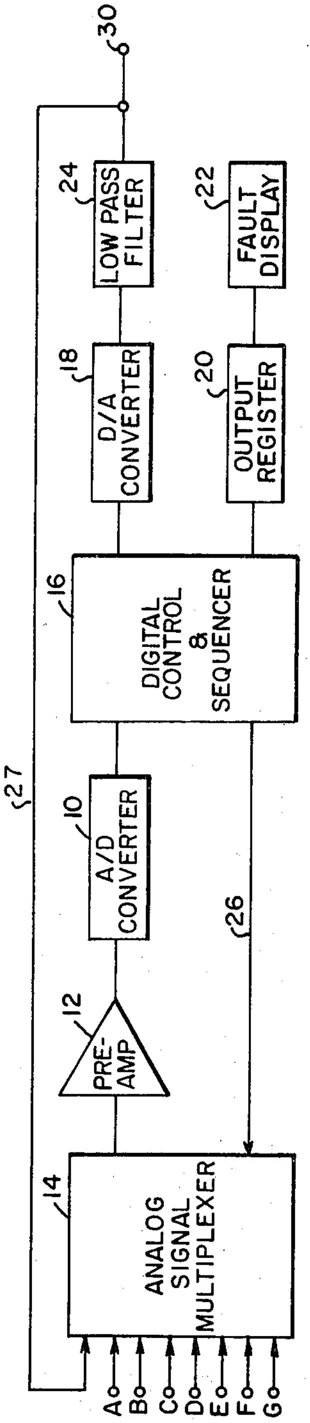
FIG. 1 illustrates a block diagram showing of the signal processor in accordance with the present invention.

In FIG. 1 an analog to digital converter operative with a preamplifier is sequentially switched between each one of a group of input signals, including a feedback of the system output signal. A digital control and sequence device orders the scanning, such that a uniform scan rate occurs, such as 40 times/second. A digital to analog converter is provided to output the analog signals in the same time sequence, whereupon a low pass filter recovers the average value of these analog signals. A fault display is included to indicate which if any of the input signals have been found to be out of tolerance and therefor rejected before passing to the low pass filter.

In FIG. 1 there is shown an analog to digital converter 10 operative with input signals received from a signal preamplifier 12. Ahead of the preamplifier is a low level analog signal multiplexer 14, which could include mercury wetted relays or be an integrated circuit device to function as a well known analog signal multiplexer. The analog signal multiplexer 14 has an address signal 26 applied for selecting which input signal is to be scanned, and could comprise a set of relays or field effect transistor switches that are driven by a decoder. In other words, the scanned input signal is selected by a decoder responsive to the address input 26 that comes from the digital control and sequence device 16. The address input 26 identifies a particular switch for selecting a particular input signal to bring into the converter 10. The digital control and sequence device 16 processes both the address input 26 applied to the analog multiplexer 14 and each of the input signals coming from the analog to digital converter 10 that are representative of respective sensed input signals, such as respective thermocouple voltages. The digital control and sequence device 16 generates corresponding output signals that go to a digital to analog converter 18, and generates reject signal output information that goes into an output register 20 and a fault display 22 for diagnostic purposes.

Figure 7:
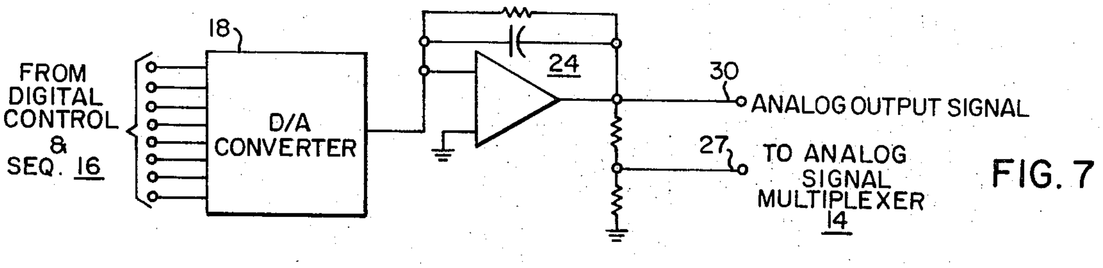
FIG. 7 is a schematic illustration of the digital to analog converter and the low pass filter shown in FIG. 1.

The signal processor shown in FIG. 1 one at a time scans the input signals and one at a time converts them into digital values. It is important that each input signal scan operation should take about the same length of time to read as the previous one, to provide a regular time sequence of the input signal readings at a uniform rate in relation to the processing of same. Each input signal is converted into a digital signal, primarily to allow a better comparison operation to establish whether a particular input signal is within or outside of the operator defined tolerance limits in relation to the desired average signal value. Input signals found acceptable in this regard and within the desired tolerance limits are converted back to analog signals again by the digital to analog converter 18 and then go to the low pass filter 24 for signal averaging. Therefore, under normal operation and at a uniform time sequence, each analog input signal from a thermocouple or other input signal transducer will be selected sequentially by the address input 26 and in this way is multiplexed into the preamplifier 12 and converted to a digital signal by the analog to digital converter 10. This digital signal is checked for tolerance validity by the digital control and sequence device 16 and then output to the digital to analog converter 18 to provide a corresponding analog voltage for a set time duration, namely one period of the scan or one step of the scan, and that analog signal voltage then charges up the low pass filter 24. Each successive analog input signal sequentially appears as an analog output signal applied to this same filter 24, which acts as an analog signal averaging device to average the values of these converted and validated and reconverted input signals. The low pass filter 24 can be a resistor input-capacitor output circuit operative as an integrating signal filter or it can be a dynamic filter using an operational amplifier as shown in FIG. 7, and its function is to do the time averaging of the respective applied input signals. It is desired to determine the time average of these scanned input signals. The output of the low pass filter 24 is representative of this average signal value and is fed back as an additional input signal to the low level analog multiplexer 14, such that when desired the output feedback signal can be scanned and run through the signal conversion process to appear as one of the components of the average signal in the output of the low pass filter 24.

A selection of this output feedback signal is made, when any one analog input signal is outside of tolerance and is to be rejected, such that this feedback signal value is substituted in place of the rejected input signal such that the time interval associated with reading that rejected analog input signal is not lost thereby out of the signal averaging operation. The net effect of this operation is that the processor operates to average the applied number of input signals one after another, and if one or more of those input signals is rejected as out of tolerance, this leaves only the desired input signals to establish the average signal supplied to output 30 and the resulting output feedback signal from the filter 24 is in effect replying to the true arithmetic average of only the remaining desired input signals, however many this is, because the filtered average output feedback signal is substituted for each rejected input signal value and does not cause any change in the average value output signal from the filter 24. In practice either a too high or a too low input signal can be rejected in this manner, by a simple comparison with the previously defined limits in relation to the average output signal. The output register 20 and fault display 22 provides a display to the operator for the input signals that have been eliminated and rejected in this manner, to give an indication either high or low corresponding to each particular input signal so rejected.

The illustration shows input signals A, B, C, D, E, F and G to be read in sequence from the industrial process, such as from turbine operating condition sensing thermocouples, and wherein each reading of the output feedback signal is also present within the sequence as an input signal to be read. It should be understood that seven input signals in addition to the feedback signal have been shown for purpose of illustration, but more or less input signals would be included in this sequence as may be desired. As each input signal reading is taken, it is compared by the digital control and sequence device 16 with a stored average value obtained from the output feedback signal input 27 to determine whether the particular input signal reading is within the desired tolerance in relation to the average. If it is, then the particular input signal reading is passed to the digital to analog converter 18 without further modification. This sequential operation can be repeated in the order of 40 times/second or more as desired so that each valid input signal reading results in an output signal from the digital to analog converter 18 every 1/40 of a second or less. The average value of these input signal readings taken over about a predetermined time period such as one or two seconds, is identical with the algebraic average of the whole group of input signals that are scanned provided that the sequence contains no stops, blanks or other discontinuities in the above described operation. One input signal reading taken in this same sequence is the output feedback signal from the low pass filter 24, and since this reading is of necessity equal to the average it may be inserted in lieu of any particular rejected input signal reading without upsetting the average, and this output feedback signal is identified and stored when it sequentially occurs. Then, when an input signal reading is found to be out of tolerance, the previously stored output feedback signal value is retrieved from memory and output to the digital to analog converter 10 in place of the defective input signal reading. In this manner the time taken to convert the output feedback signal value into digital notation does not result in any error or change in the average output from the low pass filter 24. Further elimination of a particular rejected input signal reading, but not its conversion time, is not permitted to upset the average in view of the feedback signal substitution. When an input signal reading is found to be out of tolerance, it is desired to indicate this condition on fault display 22.

Figure 2:
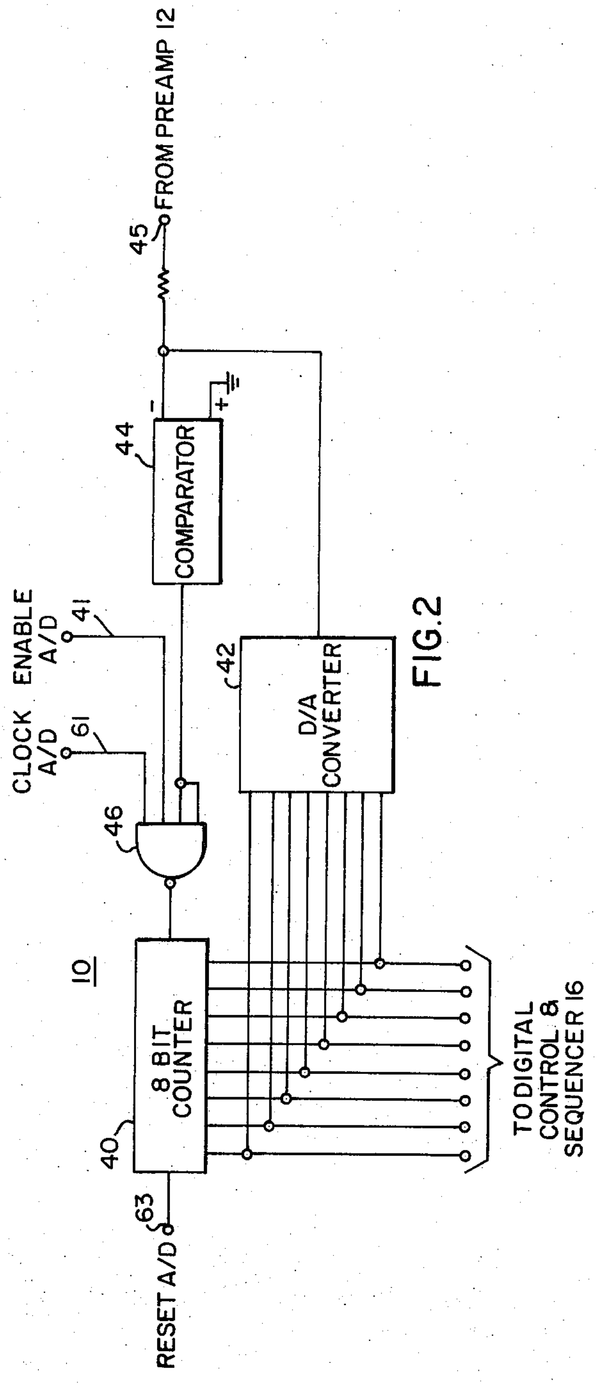
FIG. 2 is a schematic illustration of the analog to digital converter shown in FIG. 1.

In the schematic illustration of FIG. 2, a prior art analog to digital signal converter arrangement is set forth, and includes an eight bit counter 40 for purpose of illustration, a digital to analog converter 42, a well known analog signal comparator 44 operative to provide an output signal until the scanned input signal from the preamplifier 12 and applied to input 45 is the same value as the converted feedback signal from the digital to analog converter 42. The gate circuit 46 is operative to supply clock pulses from the oscillator 60 to be described in relation to FIG. 4 and within the digital control and sequencer 16 shown in FIG. 1, to count up the eight bit counter 40 while the enable signal from the FIG. 4 sequencer is provided and while the output signal from the comparator 44 is provided. The provision of the latter enable signal will be explained in relation to the operation of the FIG. 4 sequencer portion of the digital control and sequencer 16.

Figure 3:
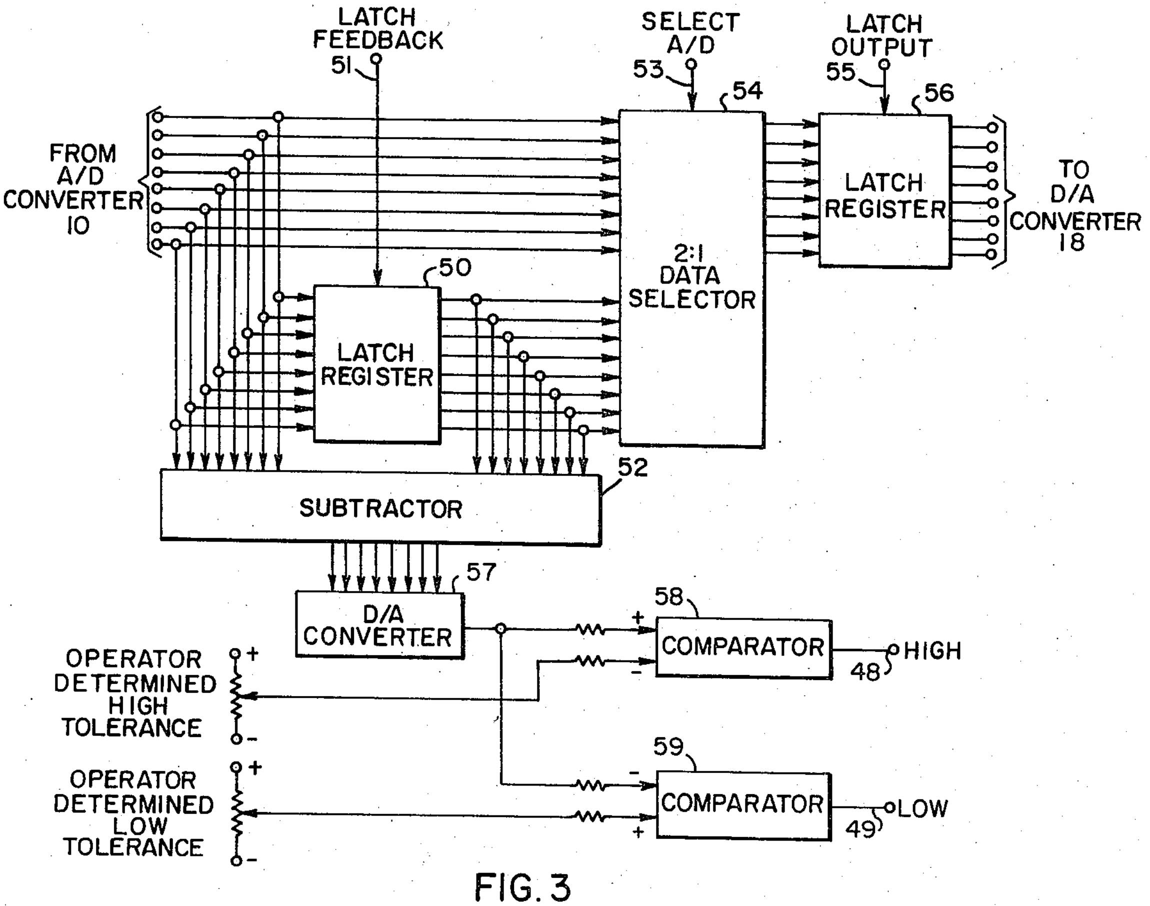
FIG. 3 is a schematic illustration of the data handling portion of the digital control and sequencer shown in FIG. 1.

In the schematic illustration of FIG. 3, the data handling portion of the digital control and sequencer 16 is set forth, and includes a latch register 50, a subtractor 52 a two to one data selector 54, a latch register 56, a digital to analog converter 57, and two signal comparators 58 and 59. The operation of the data handling circuit shown in FIG. 3 is such that the digital input signal from the analog to digital converter 10 is applied to the latch register 50, the subtractor 52 and the data selector 54. When the scanned input signal is the output feedback 27, this input signal is stored in the latch register 50 through operation of LATCH FEEDBACK signal 51. When the scanned input signal is one of the input signals A to G from the process operation sensing transducers, the subtractor 52 determines the difference between the averagee output feedback signal 27 stored in the latch register 50 and the scanned input signal and if this difference is either too high or too low such that it is outside the operator provided tolerance limits, one of a HIGH output signal 48 or a LOW output signal 49 is provided to result in the fault logic circuit of FIG. 5 to provide a select A/D control signal 53 to the data selector 54 to cause the stored average output feedback signal from the latch register 50 to pass to the latch register 56 instead of the scanned input signal, and at the beginning of the scan sequence cycle as will be later explained in relation to the chart shown in FIG. 9, in response to the latch output signal 55 the signal stored in the latch register 56 is passed to the digital to analog converter 18.

Figure 4:
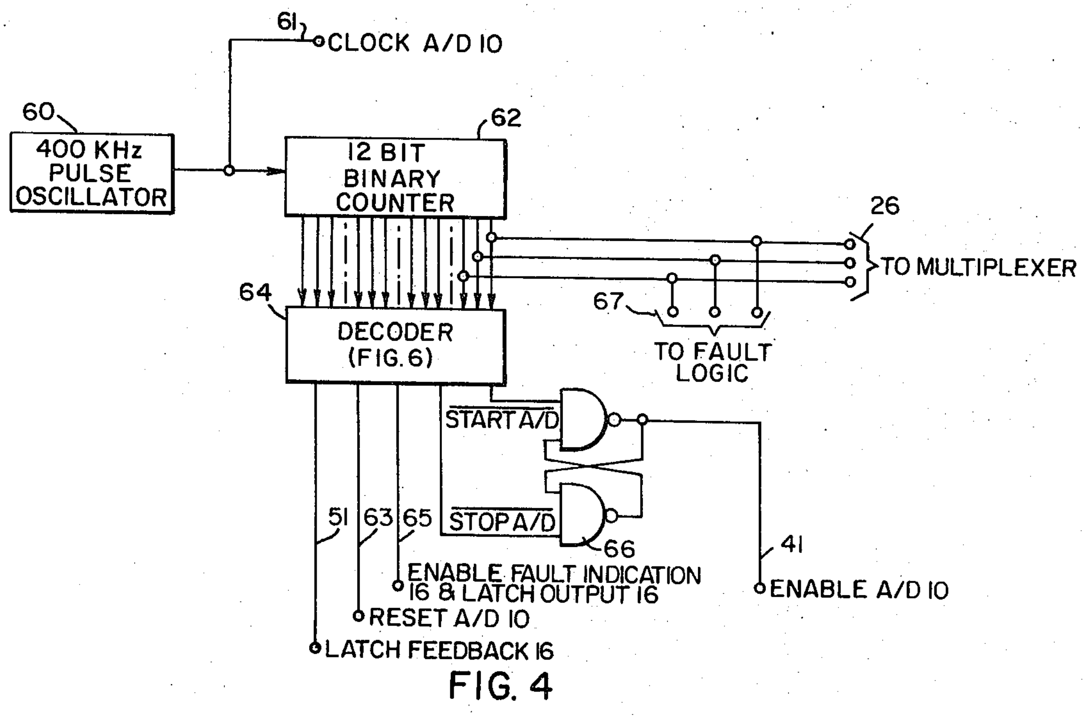
FIG. 4 is a schematic illustration of the sequencer portion of the digital control and sequencer shown in FIG. 1.

In the schematic illustration of FIG. 4, the sequencer portion of the digital control and sequencer 16 is set forth, and includes a well known pulse source, such as a 400 kilohertz pulse oscillator 60, supplying pulses to a twelve bit binary counter 62. The stored count level of the counter 60 is applied to a decoder 64 which can be made as shown in FIG. 6. The three most significant bits of the counter 62 are applied as the address input 26 to the analog signal multiplexer 14. The decoder, shown in greater detail in FIG. 6, provides as output signals the enable signal 41 to the gate circuit 46 of FIG. 2, the latch feedback signal (51) to the latch register 50 of FIG. 3, the clock signal 61 to the gate circuit 46 of FIG. 2, the reset A/D signal 63 to the analog to digital converter 10 and the enable fault indication signal 65 to the fault logic circuit of FIG. 5. The enable A/D signal 41 is provided by the flip-flop circuit 66.

Figure 5:
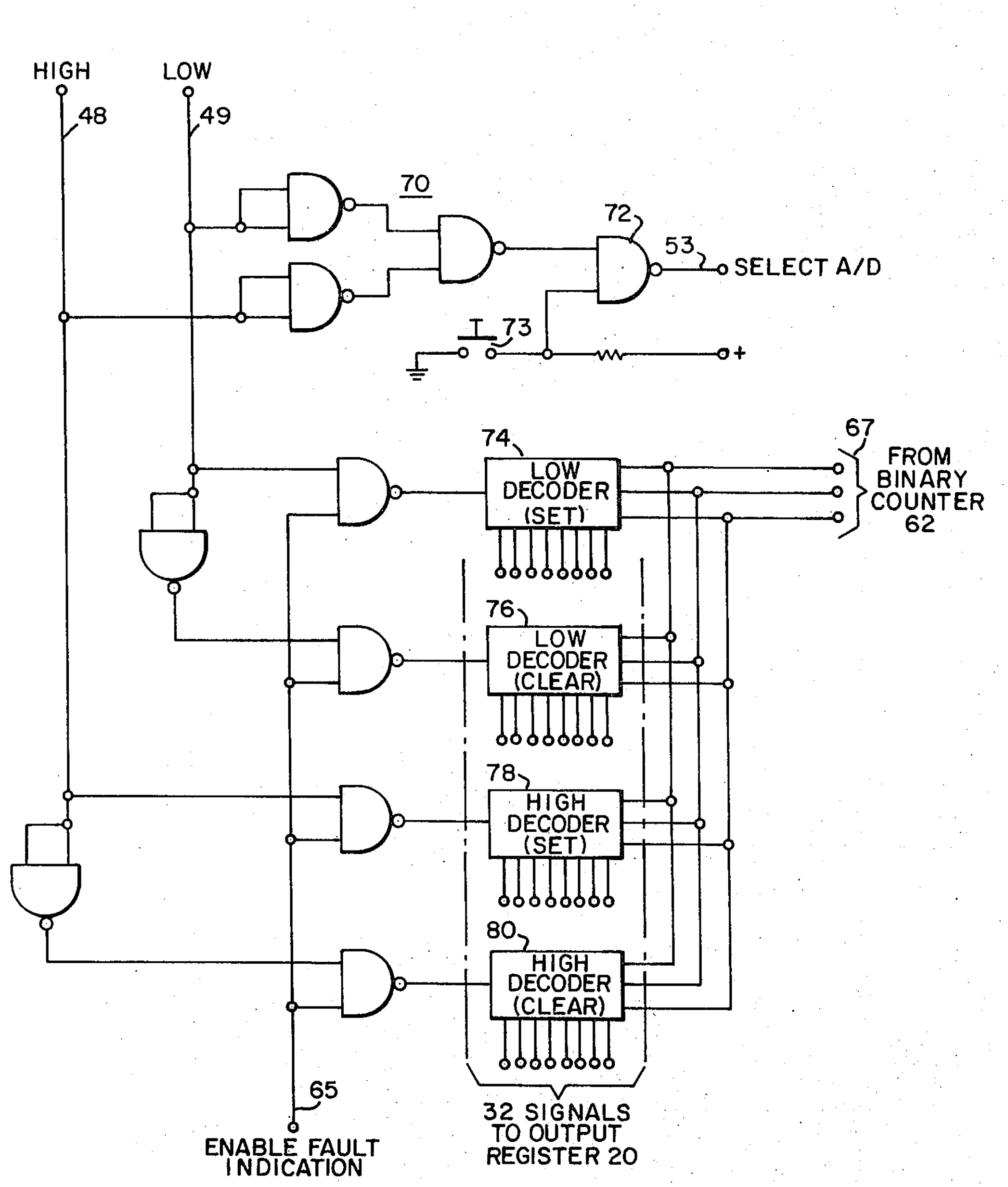
FIG. 5 is a schematic illustration of the fault logic portion of the digital control and sequencer shown in FIG. 1.
Figure 6:
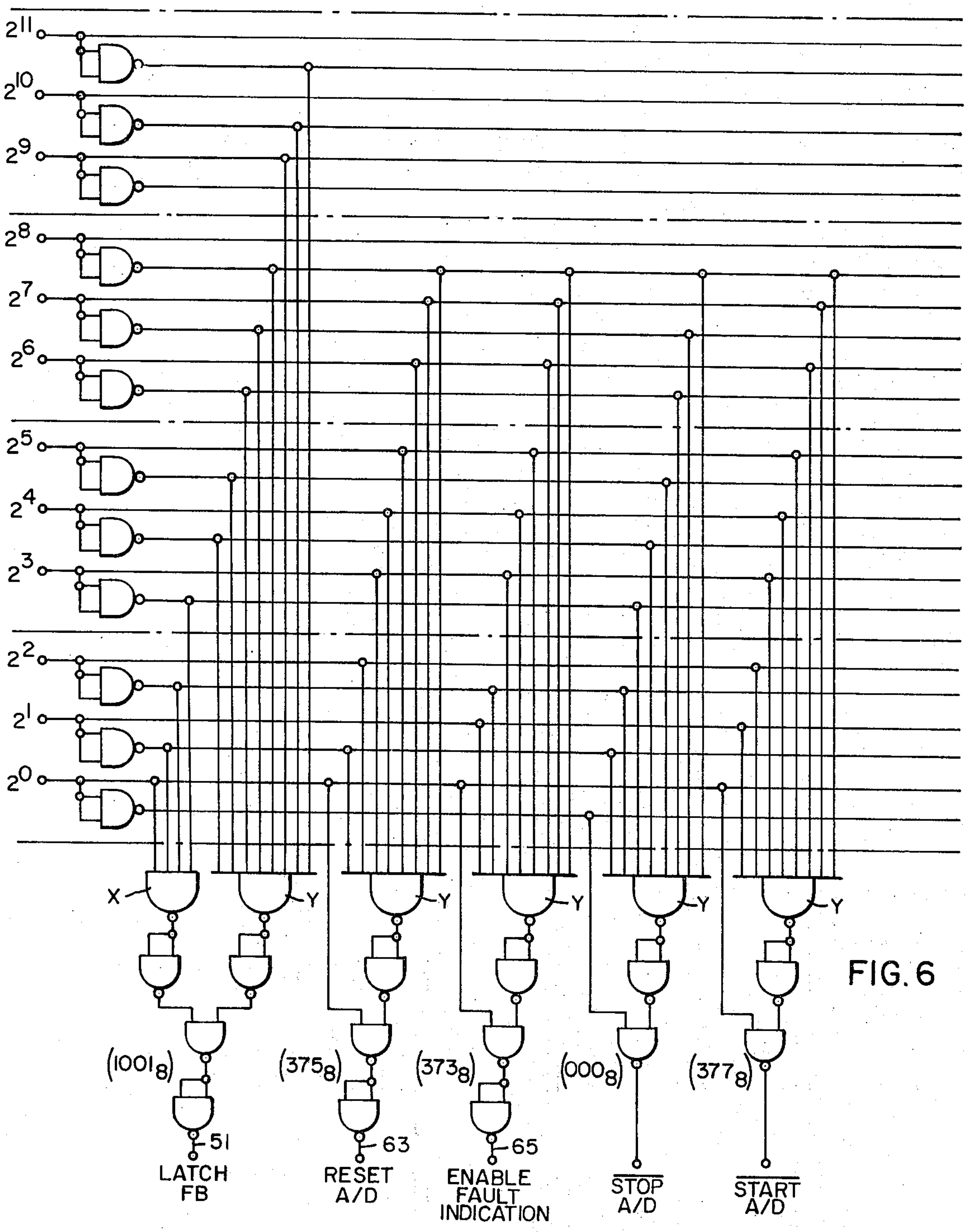
FIG. 6 is a schematic illustration of the decoder shown in FIG. 4.

The fault logic circuit shown in FIG. 5 has an OR circuit 70 operative with an inverter 72, such that the SELECT A/D signal 53 applied to the data selector 54 of FIG. 3 is provided when either the HIGH signal 48 is supplied by the comparator 58 of FIG. 3 or the LOW signal 49 is supplied by the comparator 59 of FIG. 3. Otherwise, when one of the HIGH signal 48 and LOW signal 49 is not supplied, the SELECT A/D signal 53 is not supplied and the scanned input signal is stored in the latch register 56 of FIG. 3. A low decoder set circuit 74, a low decoder clear circuit 76, an high decoder set circuit 78 and a high decoder clear circuit 80 are included. The Nand gates are operative to provide a rejected input signal identification signal to the output register 20 and fault display 22 corresponding to any scanned input signal that is rejected as either too high or too low. The particular HIGH signal 48 or LOW signal 49 input to the fault logic circuit, energized when a scanned input signal is rejected, is cooperative with the signal identification signal 67, from the three most significant bits of the binary counter 62 shown in FIG. 4, to provide the rejected input signal identification signal when the enable fault indication signal 65 is applied from the decoder 64 of FIG. 4.

An initial start-up operation should be provided to prevent the signal processor here described from rejecting all input signal readings until the low pass filter 24 has reached a substantially equilibrium average signal value condition. Thusly, during the initial start-up period, as shown in FIG. 5, a manual push button switch 73 is provided for the operator to cause the comparison operation to be ignored to avoid rejecting all input signal readings until an adequate average signal value has been established.

The decoder shown in FIG. 6 is straight forward and readily understandable to persons skilled in this art. The Nand gates, other than Nand gates X and Y, can be SN7400 integrated circuit devices. The Nand gate X can be one-half of a SN7420 device and the Nand gate Y can be a SN7430 device. It should be noted that well known OCTAL coding is being applied here.

In FIG. 7 there is shown a well known digital to analog converter 18 and a well known low pass filter 24. The output 30 is providing the averaged input signal value, and the output 27 is providing a reduced averaged signal value to be used as the output feedback signal.

Figure 8:
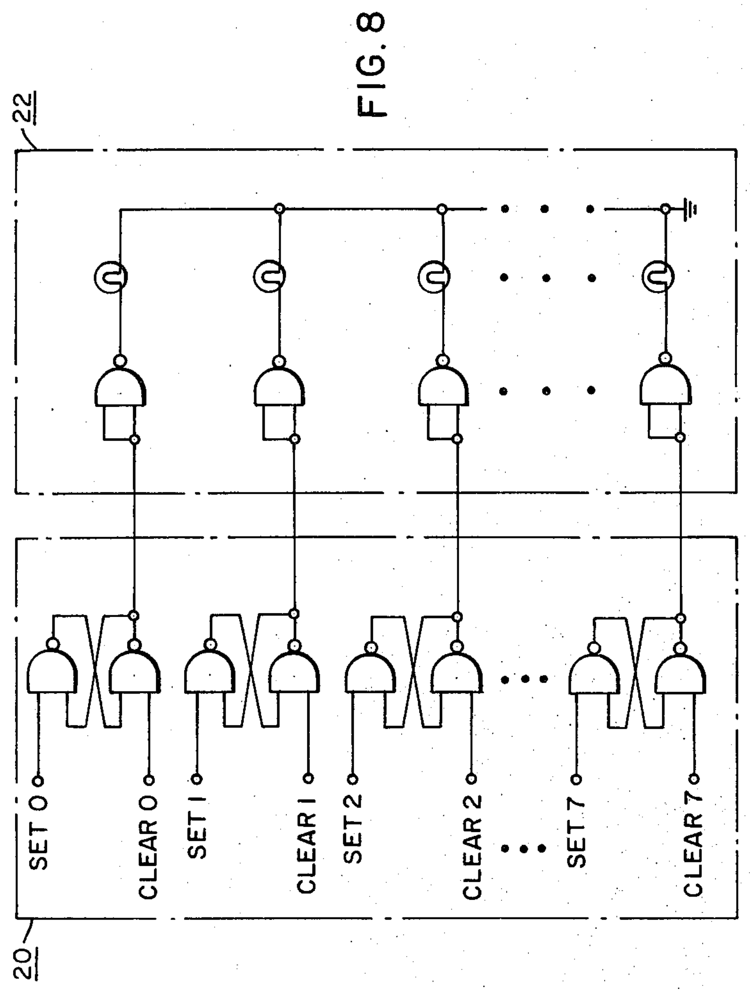
FIG. 8 is a schematic illustration of the output register and fault display shown in FIG. 1.

In FIG. 8 there are shown a well known output register 20 and a well known fault display 22. In relation to the decoders 74, 76, 78 and 80 shown in FIG. 5, it should be understood that the flip-flops responsive to eight low set bits and eight low clear bits are generally shown in FIG. 8, with both a low group of such flip-flops and a high group of such flip-flops being required. Similarly, an indicator lamp for each flip-flop in both the low and high groups will be required.

In FIG. 9 there is shown a chart illustrating the control signal decoding operation of the decoder 64 shown in FIG. 4. The count level of the binary counter 62 is OCTAL decoded to derive the left most count indication shown in FIG. 9. For example, in relation to the three most significant bits of the counter 62 the following decoding occurs:

| BITS | OCTAL CODE |
|---|---|
| 000 | 0 |
| 001 | 1 |
| 010 | 2 |
| 011 | 3 |
| 100 | 4 |
| 101 | 5 |
| 110 | 6 |
| 111 | 7 |

It should be noted that the output signal bits from the binary counter 62 are arranged by dotted lines into four such OCTAL groupings, and each of these groupings correspond with one digit of the indicated COUNT of FIG. 9. The functional event that occurs in relation to each of the OCTAL COUNT values is indicated in FIG. 9 in a manner that can be readily understood by persons skilled in this art.

Figure 10:
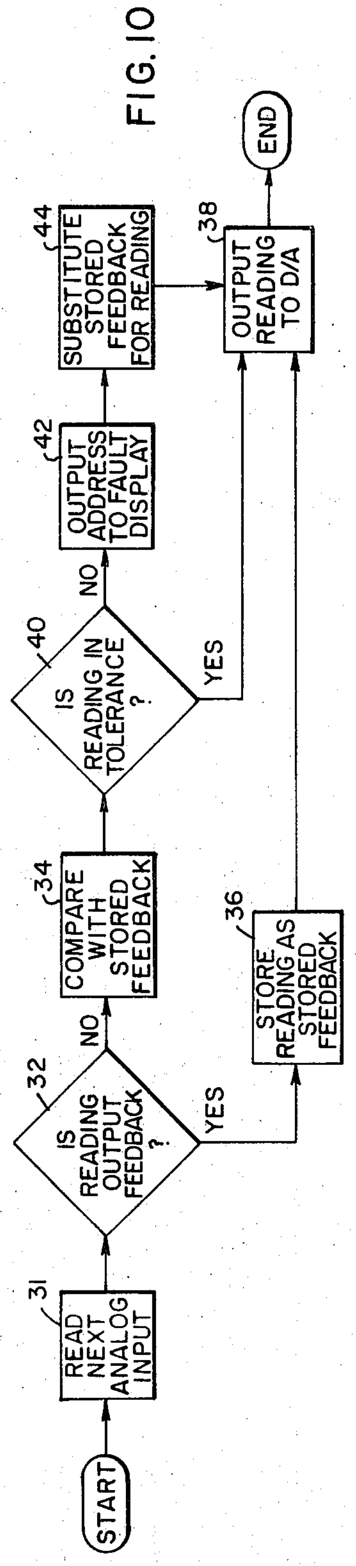
FIG. 10 shows a functional sequence flow chart to illustrate the operation of the analog signal processor according to the present invention.

In relation to the functional sequence flow chart shown in FIG. 10, this illustrates the operation of the signal processor, and if desired could be implemented as a software control program for a general purpose digital computer. The program starts at step 30, where the next analog input signal in sequence is read. At step 32 a decision is made to determine if the analog input signal last read is the output feedback signal 27. If the last input signal is not the output feedback signal and instead is one of the other input signals, that is one of the regular process operation indicative input signals, at the next step 34 the last input signal reading is compared with the stored output feedback signal. On the other hand, if the last input signal reading is indeed the one associated with the output feedback signal 27, a yes answer at step 32 advances the program to step 36 where the reading is stored in memory as "stored feedback". The average output feedback signal 27 is stored at step 36 and then the program goes to step 38 to output that stored feedback signal to the digital to analog converter 18. If the last input signal reading at step 32 is not the output feedback signal 27, then the program goes to step 34 to compare the last input signal with the stored feedback to see if it is within tolerance, such as within some predetermined 5 or 1% or whatever the operator desired tolerance is determined to be. Step 40 determines if the last input signal reading is consistent with the stored average signal, and if it is the program advances to step 38, where the last input signal reading is output to the digital to analog converter 18 and then the program ends and goes back to start. The operation is such that regardless of whether the last input signal reading is the output feedback signal or one of the analog temperature input signals, the basic operation is to read the last input signal value, convert it, check it for validity, and of valid put it out on the digital to analog converter 18 at step 38. On the other hand, going back to step 40 to determine if this last read input signal is in tolerance, if it is not in tolerance then at step 42 an output address is provided to the fault display. For an out of tolerance input signal reading it is desired to identify that input signal on the fault display, and in practice probably several different such rejected input signal readings could be displayed simultaneously. Thusly, each input signal that is rejected at step 40 is displayed on a fault display 22 for the purpose of operator evaluation of the associated process operation to check why a particular input signal is out of tolerance or for a maintenance purpose to identify which input reading was rejected. The next step 44 substitutes the stored output feedback signal for the rejected input signal reading. In other words, if a given input signal reading was not in tolerance, it is identified on the fault display and then a substitution is made of the prestored value of the output feedback signal 27 which is the average output feedback after the previous cycle of sequential input signal processing operation.

SIGNAL PROCESSOR CONSTRUCTION DETAILS

The signal processor of the present invention can be constructed by using well known prior art integrated circuit devices presently available in the open market. For example, the following three catalogs describe suitable such circuit component devices:

A. Motorola Semiconductor Products Inc., Linear Integrated Circuits Data Book, dated 1973, Third Edition.

B. National Semiconductor Corp., MOS Integrated Circuits, dated February 1972

C. Texas Instruments Corp., TTL Data Book, First Edition, dated 1973

In regard to the provided illustrations shown in the respective figures of the drawings, the following construction relationships can be employed:

| Figure Number | Circuit Component | Integrated Circuit Device | Catalog and Page |
|---|---|---|---|
| 2 | Counter 40 | Two SN74161 | C, page 325 |
| | D/A Converter 42 | MC1408L | A, page 8–186 |
| | Comparator 44 | MCC1710C | A, page 8–628 |
| | Gate 46 | one half SN7420 | C, page 87 |
| 3 | Latch register 50 | Two SN7475 | C, page 182 |
| | Subtractor 52 | Two SN74181 | C, page 381 |
| | Data Selector 54 | Two SN74157 | C, page 317 |
| | Latch register 56 | Two SN7475 | C, page 182 |
| | D/A Converter 57 | MC1408L | A, page 8–186 |
| | Comparator 58 | MCC1710C | A, page 8–628 |
| | Comparator 59 | MCC1710C | A, page 8–628 |
| 4 | Counter 62 | Three SN74161 | C, page 325 |
| | Decoder 64 (See FIG. 6) | Fourteen SN7400 | C, page 87 |
| | | Five SN7430 | C, page 87 |
| | | One half SN7420 | C, page 87 |
| | Flip-flop 66 | SN7400 | C, page 87 |
| 5 | OR 70 | SN7400 | C, page 87 |
| | Inverter 72 | SN7400 | C, page 87 |
| | Decoders 74, 76, 78 and 80 | SN7442A | C, page 167 |
| | Nand Gates | SN7400 | C, page 87 |
| 6 | (See Above FIG. 4) | | |
| 7 | D/A Converter 18 | MC1408L | A, page 8–186 |
| | Filter 24 | MC1741SC | A, page 8–460 |
| 8 | Nand Gates | SN7400 | C, page 87 |

I claim:

1. In a signal processor for operation with a plurality of input signals, the combination of means for sequentially sensing each of said plurality of input signals in a desired time relationship, means for establishing a control signal which has a predetermined numerical relationship with said plurality of input signals, means for comparing each one of said sensed input signals with said control signal to select those input signals falling within a predetermined tolerance with said control signal, means for substituting said control signal instead of any one input signal not selected by said means for comparing.

2. The signal processor of claim 1, with said means for establishing being operative to provide an output signal related to the value of said control signal.

3. The signal processor of claim 1, with said numerical relationship being the average of the input signals selected by said means for comparing.

4. The signal processor of claim 1, with said time relationship being a scanning cycle related to the number of said plurality of input signals.

5. In the method of determining a predetermined numerical relationship between N applied input analog signals, the steps of sensing said N input signals one at a time in a predetermined sequence such that the same time interval is provided to sense each of said input signals, establishing a control signal representative of said numerical relationship between said N input signals, comparing each one of said N input signals with said control signal to determine if said one input signal should be included for establishing said control signal, and substituting said control signal for any rejected input signal for establishing said control signal.

6. The method of claim 5, with said step of sensing said N input signals including the sensing of said control signal as part of said sequence.

7. The method of claim 5, including the step of providing an output signal in accordance with said numerical relationship.

8. The method of claim 5, with said numerical relationship being the average value of said N input signals.

* * * * *